(12) United States Patent
Xu et al.

(10) Patent No.: US 12,524,993 B2
(45) Date of Patent: Jan. 13, 2026

(54) SYSTEMS, METHODS, AND APPARATUSES FOR IDENTIFYING INHOMOGENEOUS LIVER FAT

(71) Applicant: KONINKLIJKE PHILIPS N.V., Eindhoven (NL)

(72) Inventors: Jing Ping Xu, Shanghai (CN); Jiayin Zhou, Shanghai (CN); Jun Ping Deng, Shanghai (CN); William Tao Shi, Wakefield, MA (US); Hua Xie, Cambridge, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 29 days.

(21) Appl. No.: 18/285,506

(22) PCT Filed: Apr. 1, 2022

(86) PCT No.: PCT/EP2022/058807
§ 371 (c)(1),
(2) Date: Oct. 4, 2023

(87) PCT Pub. No.: WO2022/214407
PCT Pub. Date: Oct. 13, 2022

(65) Prior Publication Data
US 2024/0119705 A1    Apr. 11, 2024

(30) Foreign Application Priority Data

Apr. 6, 2021 (CN) .......................... 202110398371.X

(51) Int. Cl.
*G06V 10/764* (2022.01)
*A61B 8/00* (2006.01)
(Continued)

(52) U.S. Cl.
CPC .............. *G06V 10/764* (2022.01); *A61B 8/08* (2013.01); *A61B 8/5223* (2013.01);
(Continued)

(58) Field of Classification Search
CPC ............... G06V 10/764; G06V 10/235; G06V 10/267; G06V 10/50; G06V 10/82;
(Continued)

(56) References Cited

U.S. PATENT DOCUMENTS

2009/0097726 A1 * 4/2009 Rusko .................... G06T 7/187
382/131
2019/0053790 A1 2/2019 Grover et al.
(Continued)

FOREIGN PATENT DOCUMENTS

JP 2020203078 A 12/2020
WO WO-2020020809 A1 * 1/2020 ............. A61B 8/085

OTHER PUBLICATIONS

Mabrouk, Ahmed Gaber, et al. "Automatic classification algorithm for diffused liver diseases based on ultrasound images." IEEE Access 9 (2021): 5760-5768. (Year: 2021).*
(Continued)

*Primary Examiner* — Sean D Mattson

(57) ABSTRACT

An ultrasound imaging system may acquire an image of a liver. The liver may be segmented from the image. Parameters, such as image homogeneity map, intensity probability chart, and/or speckle size diagram, may be extracted from the liver portion of the image. The parameters may be used to determine whether fatty liver deposits are diffuse or inhomogeneous. In some examples, inhomogeneous regions may be excluded from the calculation of liver fat quantification measurements. In some examples, the inhomogeneous regions may be displayed so that a user may select a
(Continued)

region of interest that excludes the inhomogeneous regions to calculate the liver fat quantification measurements.

18 Claims, 12 Drawing Sheets

(51) Int. Cl.
| | |
|---|---|
| *A61B 8/08* | (2006.01) |
| *G06T 7/00* | (2017.01) |
| *G06T 7/11* | (2017.01) |
| *G06T 7/143* | (2017.01) |
| *G06T 7/174* | (2017.01) |
| *G06T 11/00* | (2006.01) |
| *G06V 10/22* | (2022.01) |
| *G06V 10/26* | (2022.01) |
| *G06V 10/50* | (2022.01) |
| *G06V 10/82* | (2022.01) |
| *G16H 50/20* | (2018.01) |

(52) U.S. Cl.
CPC ............. *G06T 7/0012* (2013.01); *G06T 7/11* (2017.01); *G06T 7/143* (2017.01); *G06T 7/174* (2017.01); *G06T 11/00* (2013.01); *G06V 10/235* (2022.01); *G06V 10/267* (2022.01); *G06V 10/50* (2022.01); *G06V 10/82* (2022.01); *G16H 50/20* (2018.01); *G06T 2207/10016* (2013.01); *G06T 2207/10132* (2013.01); *G06T 2207/20076* (2013.01); *G06T 2207/20081* (2013.01); *G06T 2207/20084* (2013.01); *G06T 2207/20104* (2013.01); *G06T 2207/30056* (2013.01); *G06V 2201/031* (2022.01)

(58) Field of Classification Search
CPC ................ G06V 2201/031; A61B 8/08; A61B 8/5223; G06T 7/0012; G06T 7/11; G06T 7/143; G06T 7/174; G06T 11/00; G06T 2207/10016; G06T 2207/10132; G06T 2207/20076; G06T 2207/20081; G06T 2207/20084; G06T 2207/20104; G06T 2207/30056; G06T 2200/24; G16H 50/20
See application file for complete search history.

(56) References Cited

U.S. PATENT DOCUMENTS

| | | |
|---|---|---|
| 2019/0295295 A1 | 9/2019 | Hyun et al. |
| 2020/0367853 A1* | 11/2020 | Yoo .................. A61B 8/085 |
| 2021/0248741 A1* | 8/2021 | Kannengiesser ...... G16H 30/20 |

OTHER PUBLICATIONS

Acharya, U. Rajendra, et al. "Ultrasound-based tissue characterization and classification of fatty liver disease: A screening and diagnostic paradigm." Knowledge-Based Systems 75 (2015): 66-77. (Year: 2015).*

Layer, G., et al. "Computerized ultrasound B-scan texture analysis of experimental fatty liver disease: influence of total lipid content and fat deposit distribution." Ultrasonic Imaging 12.3 (1990): 171-188. (Year: 1990).*

International Search Report and Written Opinion for PCT/EP2022/058807; Mailing date: Aug. 4, 2022, 10 pages.

Thijssen, J. et al., "Computer-aided B-mode ultrasound diagnosis of hepatic steatosis: a feasibility study", IEEE Transactions on Ultrasonics, Ferroelectrics, and Frequency Control, 2008, vol. 55, No. 6, pp. 1343-1354.

Ogawa, K. et al., "Computer-aided diagnostic system for diffuse liver diseases with ultrasonography by neural networks", IEEE Transactions on Nuclear Science, 1998, vol. 45, No. 6, pp. 3069-3074.

Cao, W. et al., "Application of Deep Learning in Quantitative Analysis of 2-Dimensional Ultrasound Imaging of Nonalcoholic Fatty Liver Disease", J Ultrasound Med., vol. 39, Issue 1, pp. 51-59.

Ferraioli, G. et al., "Ultrasound-based techniques for the diagnosis of liver steatosis", World J Gastroenterol, 2019, vol. 25, No. 40, pp. 6053-6062.

Anonymous, "Ultrasound Cases", retrieved from https://www.ultrasoundcases.info/cases/abdomen-and-retroperitoneum/liver/fatty-liver-and-focal-sparing/, 2023, 4 pages.

Kalyan, K. et al., "Artificial Neural Network Application in the Diagnosis of Disease Conditions with Liver Ultrasound Images", Adv Bioinformatics, 2014, vol. 2014, 14 pages.

* cited by examiner

| Item # | Description | Region zone |
|---|---|---|
| 01 | Diffuse fatty liver change | [100:150,175:225]<br>[100:150,400:450] |
| 02 | Inhomogeneous (segmental) fatty liver change | [75:125,175:215] |
| 03 | Inhomogeneous liver with multifocal fatty changes | [70:120,120:170] |
| 04 | Fatty liver with focal sparing/non steatosis of the caudate lobe mimicking a hypoechoic mass | [80:130,140:190] |
| 05 | Segmental fatty infiltration/steatosis and focal sparing/non steatosis causing an inhomogeneous liver | [50:100,100:150] |
| 06 | Inhomogeneous liver with focal fatty changes in a patient | [50:100,100:150] |
| 07 | Inhomogeneous liver with focal fatty changes in a patient | [100:150,170:220] |
| 08 | Inhomogeneous liver with focal fatty changes in a patient | [50:100,70:120] |
| 09 | Inhomogeneous liver caused by fatty liver changes | [50:100,70:120] |
| 10 | Inhomogeneous liver caused by fatty liver changes | [60:110,120:170] |
| 11 | Diffuse fatty liver changes | [110:160,120:170]<br>[110:160,410:460] |
| 12 | Focal fatty change in left lobe | [110:180,180:300] |
| 13 | Fatty liver change with normal liver residual | [110:180,180:300]<br>[110:180,58:700] |

FIG. 9

| HI | Distribution | Averaged speckle size (pixels) (axial and lateral) |
|---|---|---|
| 0.0869<br>0.1207 | Normal<br>Normal | 3 and 5<br>3 and 7 |
| 0.3085 | Non-normal | 11 and 13 |
| 0.2065 | Non-normal | 5 and 11 |
| 0.2125 | Non-normal | 7 and 13 |
| 0.2590 | Non-normal | 13 and 23 |
| 0.2053 | Non-normal | 7 and 9 |
| 0.2844 | Non-normal | 11 and 27 |
| 0.2352 | Non-normal | 9 and 15 |
| 0.3692 | Non-normal | 11 and 21 |
| 0.2823 | Non-normal | 11 and 15 |
| 0.1323<br>0.0874 | Normal<br>Normal | 3 and 7<br>3 and 7 |
| 0.5181 | Non-normal | 9 and 31 |
| 0.6729<br>0.5884 | Non-normal<br>Non normal | 7 and 15<br>15 and 31 |

FIG. 9 continued

SYSTEMS, METHODS, AND APPARATUSES FOR IDENTIFYING INHOMOGENEOUS LIVER FAT

CROSS-REFERENCE TO PRIOR APPLICATIONS

This application is the U.S. National Phase application under 35 U.S.C. § 371 of International Application No. PCT/EP2022/058807, filed on Apr. 1, 2022, which claims the benefit of Chinese Patent Application No. 202110398371.X, filed on Apr. 6, 2021. These applications are hereby incorporated by reference herein.

TECHNICAL FIELD

The present disclosure pertains to imaging systems and methods for assessing liver fat with ultrasound imaging. In particular, imaging systems and methods for identifying regions of inhomogeneous liver fat.

BACKGROUND

The prevalence of hepatic steatosis (fat content more than 5% of total liver) is increasing worldwide due to obesity and insulin resistance, which are risk factors for non-alcoholic fatty liver disease (NAFLD). Detection and quantification of liver fat is clinically important. For example, in the context of liver transplants, it is necessary for both the donor and recipient to have less than 10% liver fat for a successful liver transplant. Some companies have developed and implemented liver fat quantification tools using either an ultrasound attenuation coefficient, an ultrasound elasticity point measurement, or two-dimensional (2D) or three-dimensional (3D) ultrasound elastographic imaging. In order to increase measurement accuracy and reliability, the region of interest (ROI) for liver fat measurement is set to be a rectangle or circular sector of M cm (height) by N cm (width), to increase signal-to-noise ratio (SNR) from a relatively large measurement region, often a rectangle or circular sector. Typically, M is usually set to 8 cm and N varies from 2-6 cm, depending on the algorithm used for fat quantification. Current algorithms assume diffuse (e.g., homogeneous) fat distribution in the liver. However, an estimated 10% of chronic liver disease patients have inhomogeneous liver fat infiltration. The fat quantification algorithms may provide incorrect liver fat measurements for these patients. Therefore, it is important to determine during the measurement workflow if the patient with chronic liver disease has the diffuse or inhomogeneous liver fat distribution at the ROI for liver fat quantification.

SUMMARY

Systems, methods, and apparatuses for identifying inhomogeneous liver fat regions on ultrasound images are disclosed. Serial of 2D liver ultrasound images may be acquired and the liver region may be segmented from the 2D liver ultrasound images. After segmentation, hepatic vessels may be detected and excluded from the segmented liver region. One or more parameters such as image homogeneity, distributions of pixel intensity may be extracted from the segmented liver region. The parameters may be organized such as an image homogeneity map, an intensity probability chart, and/or a speckle size diagram. The parameters may be provided to a classification model, which may be an artificial intelligence model (e.g., deep learning model) in some examples. ROIs may be classified by the model, for example, as one of two cases: a first case indicating the liver fat distribution is homogeneous at the ROI, or a second case indicating the fat distribution is inhomogeneous at the ROI. The classification determined may be reported as a result to a user of the ultrasound imaging system. In some examples, the segmented liver ultrasound image may be provided to the user. The systems, methods, and apparatuses disclosed herein may provide an automated or semi-automated pre-processing tool in a liver fat quantification tool to facilitate acquisition of accurate fat quantification measurements.

According to at least one example of the present disclosure, an ultrasound imaging system may be configured to provide classification of liver fat deposits. The system may include a non-transitory computer readable medium encoded with instructions and configured to store a series of images and at least one processor in communication with the non-transitory computer readable medium and configured to execute the instructions, wherein when executed, the instructions cause the at least one processor to segment a liver region from at least one image of the series of images, extract at least one parameter from the liver region, classify a liver fat deposit in the liver region as diffuse or inhomogeneous based at least in part on the at least one parameter, and provide a result, based at least in part, on a classification of the liver fat deposit.

According to at least one example of the present disclosure, a method for providing a classification of liver fat deposits may include receiving a series of images, segmenting, with at least one processor, a liver region from at least one image of the series of images, extracting, with the at least one processor, at least one parameter from the liver region, classifying, with the at least one processor, a liver fat deposit in the liver region as diffuse or inhomogeneous based at least in part on the at least one parameter, and providing a result, based at least in part, on a classification of the liver fat deposit.

BRIEF DESCRIPTION OF THE DRAWINGS

FIG. 9 is a table of example parameters extracted from two dimensional images of livers.

DETAILED DESCRIPTION

Figure 1:
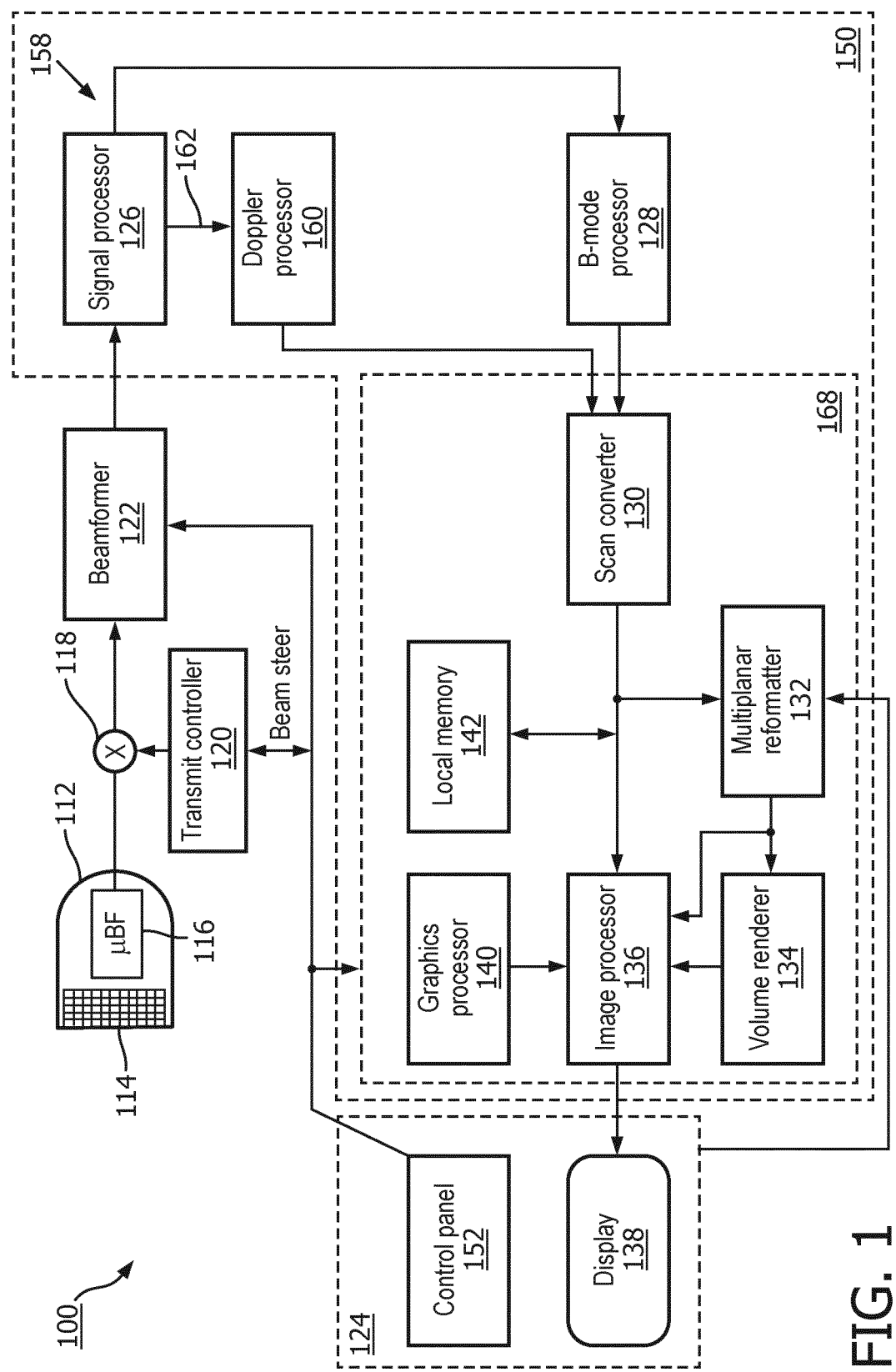
FIG. 1 is a block diagram of an ultrasound system in accordance with principles of the present disclosure.

The following description of certain embodiments is merely exemplary in nature and is in no way intended to limit the invention or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed apparatuses, systems and methods, and it is to be understood that other embodiments may be utilized and that structural and logical changes may be made without departing from the spirit and scope of the present disclosure. Moreover, for the purpose of clarity, detailed descriptions of certain features will not be discussed when they would be apparent to those with skill in the art so as not to obscure the description of the present apparatuses, systems, and methods. The following detailed description is therefore not to be taken in a limiting sense, and the scope of the present system is defined only by the appended claims.

Existing fat quantification algorithms typically provide acceptable estimates for liver fat quantification for diffuse/homogeneous liver fat deposition due to a relatively large region used for averaging purpose to increase the signal-to-noise ratio (SNR). The liver fat quantification measurement (also referred to simply as measurement) is typically repeated multiple times on a selected ultrasound image by shifting the location of the ROI and/or changing the size of ROI. If the standard deviation (SD) of these measurements is significantly smaller than the average value, then the measurement is considered acceptable. When the SD value is larger, the measurements are considered unacceptable. Sometimes a large SD value may be due to the operator (for example, not putting ultrasound probe at the proper transmission angle) or the patient (for example, not holding breath during image acquisition). However, in other cases, the large SD value may be due to inhomogeneous fat deposits in the liver. How to determine whether a patient being examined has a homogeneous liver fat distribution or has inhomogeneous liver fat distribution at a specific region may be difficult for an operator to determine. Pre-measurement visual inspection by the operator may be performed, but success depends on the operator's experience and visual perception is sometimes unreliable due to the insensitive differentiating capability of human vision to grayscale. Accordingly, a pre-processing step that can automatically determine the type of patient liver fat distribution (e.g., homogeneous or inhomogeneous) in advance may be desirable.

Automatically determining whether regions of a patient's liver include inhomogeneous fat deposits may permit the operator to select suitable ROIs (e.g., regions of homogenous fat distribution) for liver fat quantification measurements and/or select a different algorithm for making liver fat quantification measurements. In some applications, this may improve reliability of liver fat quantification measurements. In some applications, this may reduce the workload of the operator as reliable measurements may be acquired in less time when suitable regions for placing the ROI are identified in advance. In some applications, the presence of and/or prevalence of inhomogeneous liver fat distribution may itself provide a diagnostic indicator of liver health.

Examples of the present disclosure may include systems and methods to compute various image parameters for 2D liver ultrasound images. Examples of image parameters include, but are not limited to, homogeneity maps, speckle size, probability distributions of, for example, image pixel intensities. The computer image parameters may be provided to a machine learning model. The machine learning model may be trained to determine whether one or more regions of the liver include homogeneous (e.g., diffuse) or inhomogeneous liver fat distribution. An ultrasound imaging system may provide an indication of the determination to a user of the ultrasound imaging system. For example, the ultrasound imaging system may provide a visual or auditory warning when a user selects a ROI including inhomogeneous liver fat distribution for liver fat quantification measurements. Thus, the user may be prompted to select a different region of the liver as the ROI for the measurements. In another example, the ultrasound imaging system may provide an overlay over the 2D liver ultrasound images that indicates which regions include homogeneous fat distribution and/or include inhomogeneous fat distribution. Thus, the user may be able to see which regions of the 2D liver ultrasound image are suitable for selection as the ROI for liver fat quantification measurements.

Optionally, in some examples, systems and methods may include techniques for allowing the user to confirm the liver is properly segmented in the 2D ultrasound images. Optionally, in some examples, systems and methods may include providing information on the 2D image (e.g., providing on the display the values of the calculated image parameters, shape of the segmented liver).

FIG. 1 shows a block diagram of an ultrasound imaging system 100 constructed in accordance with the principles of the present disclosure. An ultrasound imaging system 100 according to the present disclosure may include a transducer array 114, which may be included in an ultrasound probe 112, for example an external probe or an internal probe. The transducer array 114 is configured to transmit ultrasound signals (e.g., beams, waves) and receive echoes responsive to the ultrasound signals. A variety of transducer arrays may be used, e.g., linear arrays, curved arrays, or phased arrays. The transducer array 114, for example, can include a two dimensional array (as shown) of transducer elements capable of scanning in both elevation and azimuth dimensions for 2D and/or 3D imaging. As is generally known, the axial direction is the direction normal to the face of the array (in the case of a curved array the axial directions fan out), the azimuthal direction is defined generally by the longitudinal dimension of the array, and the elevation direction is transverse to the azimuthal direction.

In some embodiments, the transducer array 114 may be coupled to a microbeamformer 116, which may be located in the ultrasound probe 112, and which may control the transmission and reception of signals by the transducer elements in the array 114. In some embodiments, the microbeamformer 116 may control the transmission and reception of signals by active elements in the array 114 (e.g., an active subset of elements of the array that define the active aperture at any given time).

In some embodiments, the microbeamformer 116 may be coupled, e.g., by a probe cable or wirelessly, to a transmit/receive (T/R) switch 118, which switches between transmission and reception and protects a main beamformer 122 from high energy transmit signals. In some embodiments, for example in portable ultrasound systems, the T/R switch 118 and other elements in the system can be included in the ultrasound probe 112 rather than in the ultrasound system base, which may house the image processing electronics. An ultrasound system base typically includes software and hardware components including circuitry for signal processing and image data generation as well as executable instructions for providing a user interface (e.g., processing circuitry 150 and user interface 124).

The transmission of ultrasonic signals from the transducer array 114 under control of the microbeamformer 116 is directed by the transmit controller 120, which may be coupled to the T/R switch 118 and a main beamformer 122. The transmit controller 120 may control the direction in which beams are steered. Beams may be steered straight ahead from (orthogonal to) the transducer array 114, or at different angles for a wider field of view. The transmit controller 120 may also be coupled to a user interface 124 and receive input from the user's operation of a user control. The user interface 124 may include one or more input devices such as a control panel 152, which may include one or more mechanical controls (e.g., buttons, encoders, etc.), touch sensitive controls (e.g., a trackpad, a touchscreen, or the like), and/or other known input devices.

In some embodiments, the partially beamformed signals produced by the microbeamformer 116 may be coupled to a main beamformer 122 where partially beamformed signals from individual patches of transducer elements may be combined into a fully beamformed signal. In some embodiments, microbeamformer 116 is omitted, and the transducer array 114 is under the control of the main beamformer 122 which performs all beamforming of signals. In embodiments with and without the microbeamformer 116, the beamformed signals of the main beamformer 122 are coupled to processing circuitry 150, which may include one or more processors (e.g., a signal processor 126, a B-mode processor 128, a Doppler processor 160, and one or more image generation and processing components 168) configured to produce an ultrasound image from the beamformed signals (e.g., beamformed RF data).

The signal processor 126 may be configured to process the received beamformed RF data in various ways, such as bandpass filtering, decimation, I and Q component separation, and harmonic signal separation. The signal processor 126 may also perform additional signal enhancement such as speckle reduction, signal compounding, and noise elimination. The processed signals (also referred to as I and Q components or IQ signals) may be coupled to additional downstream signal processing circuits for image generation. The IQ signals may be coupled to a plurality of signal paths within the system, each of which may be associated with a specific arrangement of signal processing components suitable for generating different types of image data (e.g., B-mode image data, Doppler image data). For example, the system may include a B-mode signal path 158 which couples the signals from the signal processor 126 to a B-mode processor 128 for producing B-mode image data.

The B-mode processor can employ amplitude detection for the imaging of structures in the body. The signals produced by the B-mode processor 128 may be coupled to a scan converter 130 and/or a multiplanar reformatter 132. The scan converter 130 may be configured to arrange the echo signals from the spatial relationship in which they were received to a desired image format. For instance, the scan converter 130 may arrange the echo signal into a two dimensional (2D) sector-shaped format, or a pyramidal or otherwise shaped three dimensional (3D) format. The multiplanar reformatter 132 can convert echoes which are received from points in a common plane in a volumetric region of the body into an ultrasonic image (e.g., a B-mode image) of that plane, for example as described in U.S. Pat. No. 6,443,896 (Detmer). The scan converter 130 and multiplanar reformatter 132 may be implemented as one or more processors in some embodiments.

A volume renderer 134 may generate an image (also referred to as a projection, render, or rendering) of the 3D dataset as viewed from a given reference point, e.g., as described in U.S. Pat. No. 6,530,885 (Entrekin et al.). The volume renderer 134 may be implemented as one or more processors in some embodiments. The volume renderer 134 may generate a render, such as a positive render or a negative render, by any known or future known technique such as surface rendering and maximum intensity rendering.

In some embodiments, the system may include a Doppler signal path 162 which couples the output from the signal processor 126 to a Doppler processor 160. The Doppler processor 160 may be configured to estimate the Doppler shift and generate Doppler image data. The Doppler image data may include color data which is then overlaid with B-mode (i.e. grayscale) image data for display. The Doppler processor 160 may be configured to filter out unwanted signals (i.e., noise or clutter associated with non-moving tissue), for example using a wall filter. The Doppler processor 160 may be further configured to estimate velocity and power in accordance with known techniques. For example, the Doppler processor may include a Doppler estimator such as an auto-correlator, in which velocity (Doppler frequency, spectral Doppler) estimation is based on the argument of the lag-one autocorrelation function and Doppler power estimation is based on the magnitude of the lag-zero autocorrelation function. Motion can also be estimated by known phase-domain (for example, parametric frequency estimators such as MUSIC, ESPRIT, etc.) or time-domain (for example, cross-correlation) signal processing techniques. The velocity and/or power estimates may then be mapped to a desired range of display colors in accordance with a color map. The color data, also referred to as Doppler image data, may then be coupled to the scan converter 130, where the Doppler image data may be converted to the desired image format and overlaid on the B-mode image of the tissue structure to form a color Doppler or a power Doppler image.

Outputs from the scan converter 130, the multiplanar reformatter 132, and/or the volume renderer 134 may be coupled to an image processor 136 for further enhancement, buffering and temporary storage before being displayed on an image display 138. A graphics processor 140 may generate graphic overlays for display with the images. These graphic overlays can contain, e.g., standard identifying information such as patient name, date and time of the image, imaging parameters, and the like. For these purposes the graphics processor 140 may be configured to receive input from the user interface 124, such as a typed patient name or other annotations. The user interface 124 can also be coupled to the multiplanar reformatter 132 for selection and control of a display of multiple multiplanar reformatted (MPR) images.

The system 100 may include local memory 142. Local memory 142 may be implemented as any suitable non-transitory computer readable medium (e.g., flash drive, disk drive). Local memory 142 may store data generated by the system 100 including ultrasound images, executable instructions, image parameters, training data sets, or any other information necessary for the operation of the system 100. In some examples, local memory 1242 may include multiple memories, which may be the same or of different type. For example, local memory 142 may include a dynamic random access memory (DRAM) and a flash memory.

As mentioned previously system 100 includes user interface 124. User interface 124 may include display 138 and control panel 152. The display 138 may include a display device implemented using a variety of known display technologies, such as LCD, LED, OLED, or plasma display technology. In some embodiments, display 138 may comprise multiple displays. The control panel 152 may be configured to receive user inputs (e.g., exam type, imaging parameters). The control panel 152 may include one or more hard controls (e.g., buttons, knobs, dials, encoders, mouse, trackball or others). In some embodiments, the control panel 152 may additionally or alternatively include soft controls (e.g., GUI control elements or simply, GUI controls) provided on a touch sensitive display. In some embodiments, display 138 may be a touch sensitive display that includes one or more soft controls of the control panel 152.

In some embodiments, various components shown in FIG. 1 may be combined. For instance, the multiplanar reformatter 132 and volume renderer 134 may be implemented as a single processor. In some embodiments, various components shown in FIG. 1 may be implemented as separate components. For example, signal processor 126 may be implemented as separate signal processors for each imaging mode (e.g., B-mode, Doppler). In another example, the image processor 136 may be implemented as separate processors for different tasks and/or parallel processing of a same task. In some embodiments, one or more of the various processors shown in FIG. 1 may be implemented by general purpose processors and/or microprocessors configured to perform the specified tasks. In some examples, the processors may be configured by providing instructions for the tasks from a non-transitory computer readable medium (e.g., from local memory 142). The instructions may then be executed by the processors. In some embodiments, one or more of the various processors may be implemented as application specific circuits. In some embodiments, one or more of the various processors (e.g., image processor 136) may be implemented with one or more graphical processing units (GPU).

Figure 2:
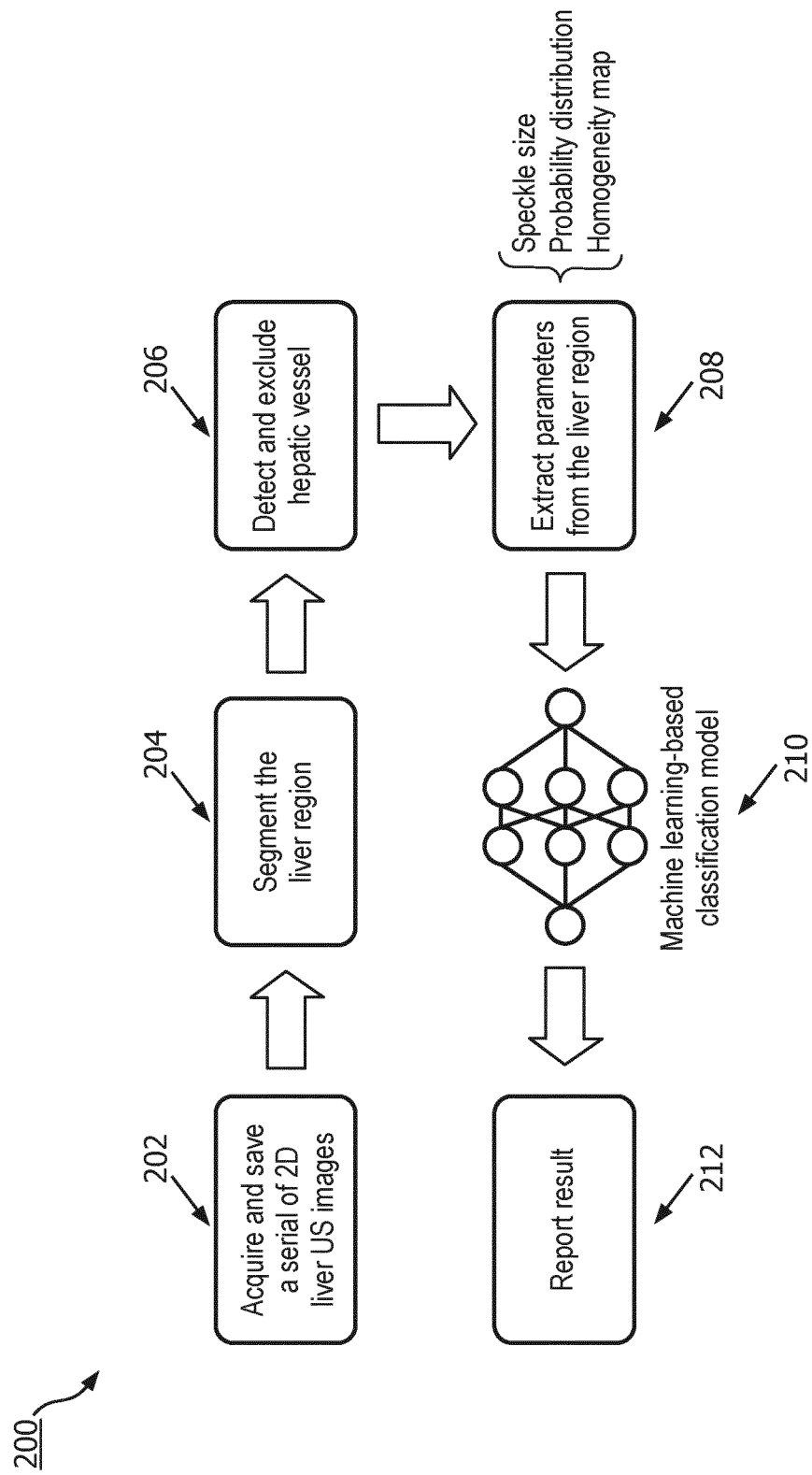
FIG. 2 is a flow diagram of a technique for classifying liver fat in accordance with principles of the present disclosure.

FIG. 2 is a flow diagram of a technique for classifying liver fat in accordance with principles of the present disclosure. The technique shown in flow diagram 200 may be performed, at least in part, by an ultrasound imaging system, such as ultrasound imaging system 100 shown in FIG. 1. While the flow diagram 200 will be described with reference to ultrasound imaging system 100, this is for explanatory purposes, and the technique shown in flow diagram 200 are not limited to being performed by the ultrasound imaging system 100.

An imaging system, such as ultrasound imaging system 100, may acquire and save (e.g., store) a series of 2D images of a liver as shown in block 202. For example, 2D images may be acquired by ultrasound probe 112. The 2D images may be stored in a non-transitory computer readable medium, such as local memory 142. In some examples, the 2D images may be of a same location of the liver acquired over time. In some examples, the 2D images may be of different locations in the liver. In other words, the 2D images may correspond to imaging planes located at different portions of the liver. The imaging planes may or may not overlap. The series of 2D images may cover a portion of the liver or the entirety of the liver. Alternatively, only a single 2D image of the liver may be acquired. An image processor, such as image processor 136, may segment regions of the one or more 2D images including liver tissue (e.g., the liver region) from the 2D images as shown in block 204. Any suitable segmentation technique may be used, such as edge detection, gradient analysis, texture analysis, watershed algorithms, machine learning models, etc. Once the liver region has been segmented from the 2D images, the image processor may analyze the liver region of the individual 2D images to detect hepatic vessels and/or other anatomical features (e.g., gall bladder) to be excluded as shown by block 206. Any suitable detection (e.g., feature extraction) technique may be used, such as Frangi models, Hessian-based algorithms, Hough-forest-based detector, machine learning models, etc. The pixels corresponding to hepatic vessels and/or other anatomical features detected may be excluded from further analysis of the liver region in the 2D images.

The image processor may extract (e.g., determine, calculate) one or more parameters from the liver region (excluding the regions corresponding to the detected hepatic vessels and/or other anatomical features) of the individual 2D images as indicated by block 208. Examples of parameters include speckle size distribution (e.g., characteristic speckle size), pixel intensity (e.g., probability) distribution, and image homogeneity. In some examples, the parameters may be extracted by analyzing one or more pixels in the liver region of the individual 2D images. Example techniques for extracting the parameters are disclosed herein.

The parameters may be organized in a variety of manners, such as an image homogeneity map, an intensity probability chart, and/or a speckle size diagram. The parameters may be provided to one or more machine learning models, such as a machine learning classification model as indicated by 210. In some examples, the machine learning model may be implemented by the image processor. In some examples, the image processor may execute instructions stored in a computer readable medium to implement the machine learning model. The image processor may implement any one or more deep learning, AI algorithms, and/or multiple neural networks (collectively, machine learning models). In some examples, image processor may implement one or more of a deep neural network (DNN), a convolutional neural network (CNN), a recurrent neural network (RNN), an auto-encoder neural network and/or single-shot-detector, or the like, to identify and classify fat in the liver as either homogenous (e.g., diffuse) or inhomogeneous. The machine learning models may be implemented in hardware (e.g., neurons of a neural network are represented by physical components) and/or software (e.g., neurons and pathways implemented in a software application) components. Neural networks implemented according to the present disclosure may use a variety of topologies and learning algorithms for training the neural networks to produce the desired output. For example, a software-based neural network may be implemented using a processor (e.g., single or multi-core CPU, a single GPU or GPU cluster, or multiple processors arranged for parallel-processing) configured to execute instructions, which may be stored in computer readable medium, and which when executed cause the processor to perform a trained algorithm. In some examples, the image processor may implement machine learning models in combination with other image processing methods (e.g., segmentation, histogram analysis).

A result, such as the classification determined by the machine learning model at 210 may be reported as indicated by block 212. In some examples, the report may be provided on a display, such as display 138. In some examples, the result may be text indicating whether or not inhomogeneous fat is present in the liver. In some examples, the result may be provided graphically. For example, an overlay may be generated and displayed on one or more of the 2D images. The overlay may include pixels corresponding to pixels of the liver region in the 2D image. pixels in a region determined to have diffuse liver fat may have one or more display properties (e.g., a particular intensity and/or hue) while pixels in a region determined to have inhomogeneous liver fat may have different display properties (e.g., a different intensity and/or hue). Other reporting techniques may also be used (e.g., auditory notice via a speaker). In some examples, based on the reporting of the result, a user may be guided to select an ROI for liver fat quantification measurements that does not include a region with inhomogeneous fat deposits. In some examples, a user may select a different algorithm or technique for acquiring liver fat quantification measurements that is adapted to inhomogeneous fat deposits.

Optionally, in some examples, rather than analyzing the entire liver region and/or reporting results on the entire liver region, a user input may be received via a user interface, such as user interface 124. The user input may indicate a ROI within the liver region of one or more of the 2D images. Extraction of parameters, classification, and/or reporting may be limited to pixels within the ROI. In these examples, reporting may include providing a warning to the user when the selected ROI is determined to included inhomogeneous fat. The warning may be graphical (e.g., the ROI or a box indicating the ROI may change color), textual (e.g., a warning message on the screen), and/or other medium (e.g., auditory alarm from a speaker, vibration by motor in control panel). In some examples, the user may be prompted to select a different ROI for acquiring liver fat quantification measurements.

Optionally, in some examples, rather than reporting the classification of liver fat from the machine learning model to the user, the result may be used by the image processor to calculate the liver fat quantification measurements. For example, the portions of the liver indicated by the machine learning model to include inhomogeneous liver fat may be excluded from the liver region, similar to exclusion of the hepatic vessels and/or other anatomical features. The remaining liver region may be used to calculate the liver fat quantification measurements. For example, the image processor may apply an algorithm that uses an assumption of diffuse/homogenous liver fat distribution to calculate the liver fat quantification measurements. In these examples, the result reported to the user may be the liver fat quantification measurement (e.g., as text on the display) rather than the classification.

Optionally, in some examples, the segmented images generated at block 204 and/or block 206 may be provided to the user on the display. This may allow the user to confirm the segmentation operation was performed properly. In some examples, the user may adjust the borders and/or other parameters of the segmentation (e.g., seed points) if dissatisfied with the segmentation performed by the image processor.

While reference is made to 2D images (e.g., images provided by the scan converter 130 and/or multiplanar reformatter 132 to the image processor), the technique described in flow diagram 200 may be applied to RF data (e.g., data received before or after beamforming by beamformer 122) or minimally processed data (e.g., data received from signal processor 126).

Although the technique in flow diagram 200 was described in reference to an image processor, in some examples, other processors may perform some or all of the portions of the technique. For example, a graphics processor, such as graphics processor 140 may generate the overlay displayed on the one or more 2D images. In some examples, the image processor may include one or more processors which may perform tasks in parallel and/or be designated for different tasks. For example, a processor may segment the liver region from the series of 2D images and another processor may implement the machine learning model.

In various examples, the machine learning model or models used to classify the liver fat deposits may be trained using any of a variety of currently known or later developed learning techniques to obtain a trained model, such as a neural network (e.g., a trained algorithm or hardware-based system of nodes) that is configured to analyze input data in the form of ultrasound images, parameters, measurements, and/or statistics. In some embodiments, the machine learning models may be statically trained. That is, the machine learning models may be trained with a data set and deployed on an imaging system and implemented by one or more processors, such as image processor 136. In some examples, the machine learning models may be dynamically trained. In these examples, the machine learning models may be trained with an initial data set and deployed on an imaging system. However, the machine learning models may continue to train and be modified based on ultrasound images acquired by the system after deployment of the machine learning models on the system and implemented by the image processor.

Figure 3:
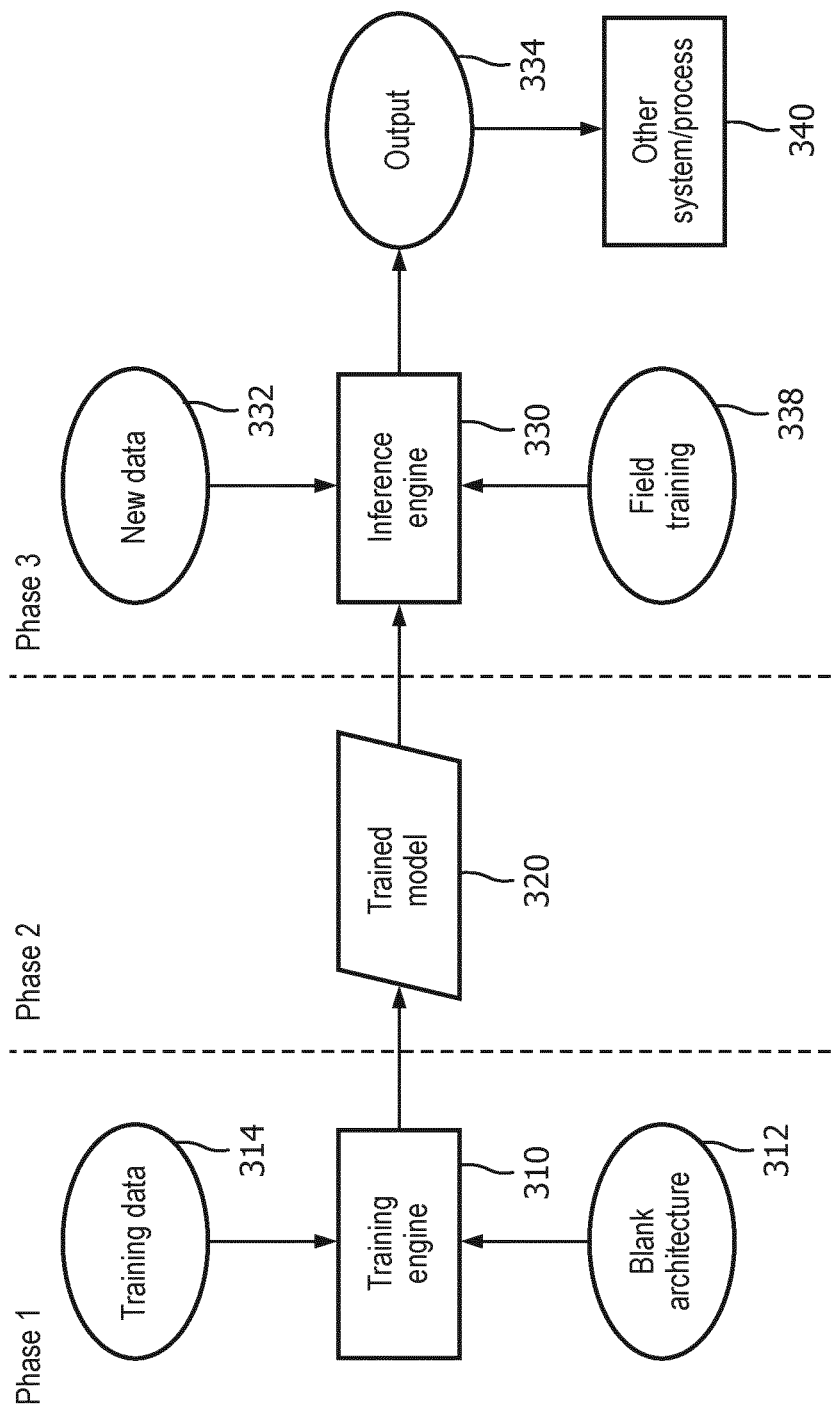
FIG. 3 shows a block diagram of a process for training and deployment of a neural network in accordance with the principles of the present disclosure.

FIG. 3 shows a block diagram of a process for training and deployment of a neural network in accordance with the principles of the present disclosure. The process shown in FIG. 3 may be used to train machine learning models implemented by a medical imaging system, such as the machine learning model shown in FIG. 2. The left hand side of FIG. 3, phase 1, illustrates the training of a machine learning model. To train the machine learning model, training sets which include multiple instances of input arrays and output classifications may be presented to the training algorithm(s) of the machine learning model(s) (e.g., AlexNet training algorithm, as described by Krizhevsky, A., Sutskever, I. and Hinton, G. E. "*ImageNet Classification with Deep Convolutional Neural Networks*," NIPS 2012 or its descendants). For example, training sets may include one or more parameters extracted from ultrasound images (e.g., speckle size, probability distribution, etc.) and a corresponding classification (e.g., homogeneous or inhomogeneous liver fat).

Training may involve the selection of a starting architecture 312 and the preparation of training data 314. The starting architecture 312 may be a blank architecture (e.g., an architecture with defined layers and arrangement of nodes but without any previously trained weights) or a partially trained model, such as the inception networks, which may then be further tailored for classification of ultrasound images. The starting architecture 312 (e.g., blank weights) and training data 314 are provided to a training engine 310 (e.g., ADAM optimizer) for training the model. Upon sufficient number of iterations (e.g., when the model performs consistently within an acceptable error), the model 320 is said to be trained and ready for deployment, which is illustrated in the middle of FIG. 3, phase 2.

The right hand side of FIG. 3, or phase 3, the trained model 320 is applied (via inference engine 330) for analysis of new data 332, which is data that has not been presented to the model during the initial training (in phase 1). For example, the new data 332 may include unknown images such as live ultrasound images acquired during a scan of a patient (e.g., liver images) and/or parameters extracted from the unknown images. The trained model 320 implemented via engine 330 is used to classify the unknown images in accordance with the training of the model 320 to provide an output 334 (e.g., determination as whether a pixel or a group of pixels includes homogeneous or inhomogeneous fat distribution). The output 334 may then be used by the system for subsequent processes 340 (e.g., generating an overlay for display on the ultrasound image, calculating fat quantification measurements). Optionally, when the trained model 320 is dynamically trained (e.g., as discussed with reference to FIG. 1), the trained model may 320 continue to train after implementation, as indicated by field training 338. In some examples, the new data 332 may be used for field training the trained model 320.

In the embodiments where the trained model 320 is used to implement a neural network executed by a processor, such as image processor 136, the starting architecture may be that of a convolutional neural network, or a deep convolutional neural network, which may be trained to determine whether a pixel or a region including multiple pixels includes inhomogeneous fat deposits or homogenous (e.g., diffuse) fat distribution. The training data 314 may include multiple (hundreds, often thousands or even more) annotated/labeled parameters, also referred to as training data. It will be understood that the training data need not be extracted from a full image produced by an imagining system (e.g., representative of the full field of view of an ultrasound probe or entire volume) but may include patches or portions of images, for example, those portions that include organs of interest or portions of an organ of interest.

Figure 4:
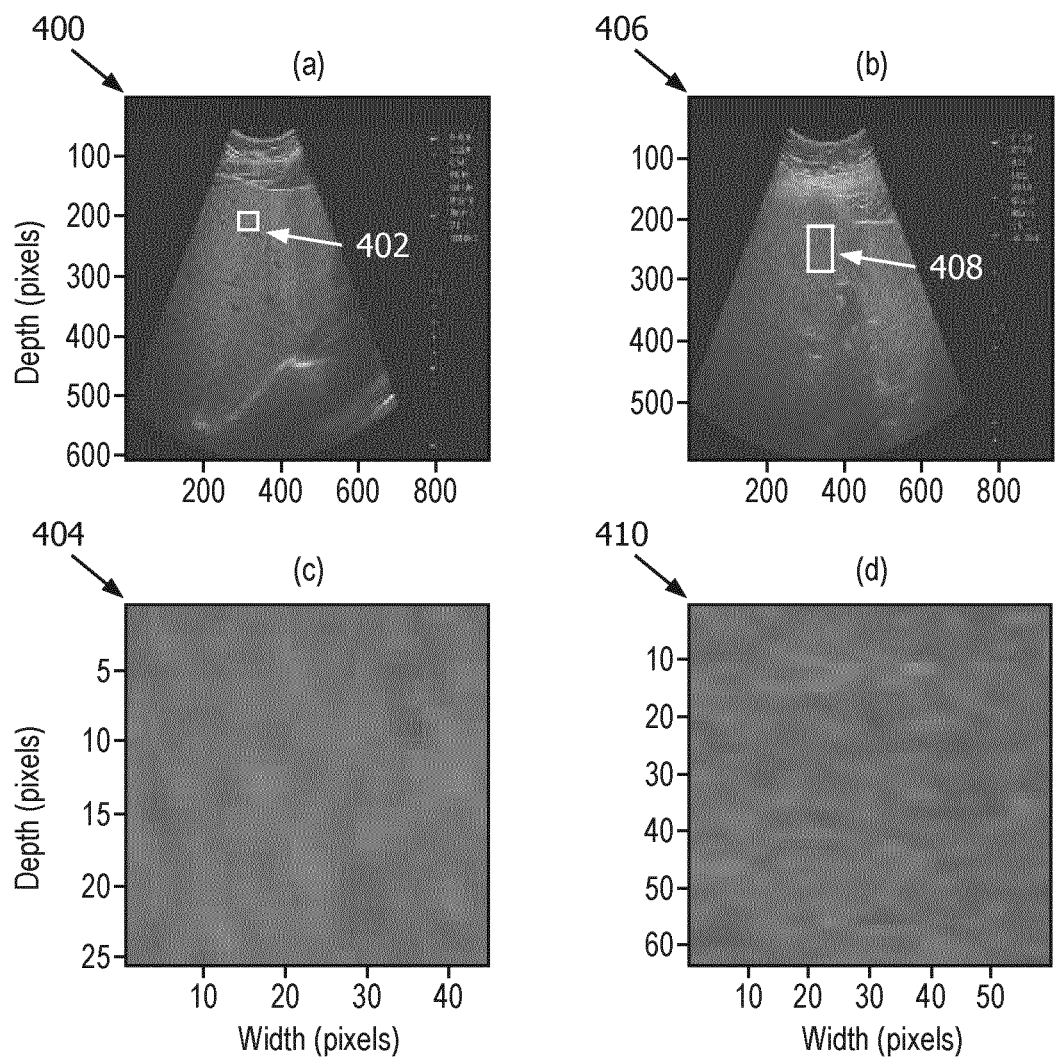
FIG. 4 shows example two-dimensional images of portions of livers with homogeneous fat distribution.

FIG. 4 shows example two-dimensional images of portions of livers with homogeneous fat distribution. Image 400 is an image of a portion of a liver including homogeneous (e.g., diffuse) fat distribution. A ROI is indicated by box 402. Image 404 is a "zoomed in" view of the ROI in box 402. Image 406 is an image of a portion of a liver including homogeneous fat distribution. A ROI is indicated by box 408. Image 410 is a "zoomed in" view of the ROI in box 408. Both image 400 and 402 are 2D ultrasound images acquired by an ultrasound imaging system.

Figure 5:
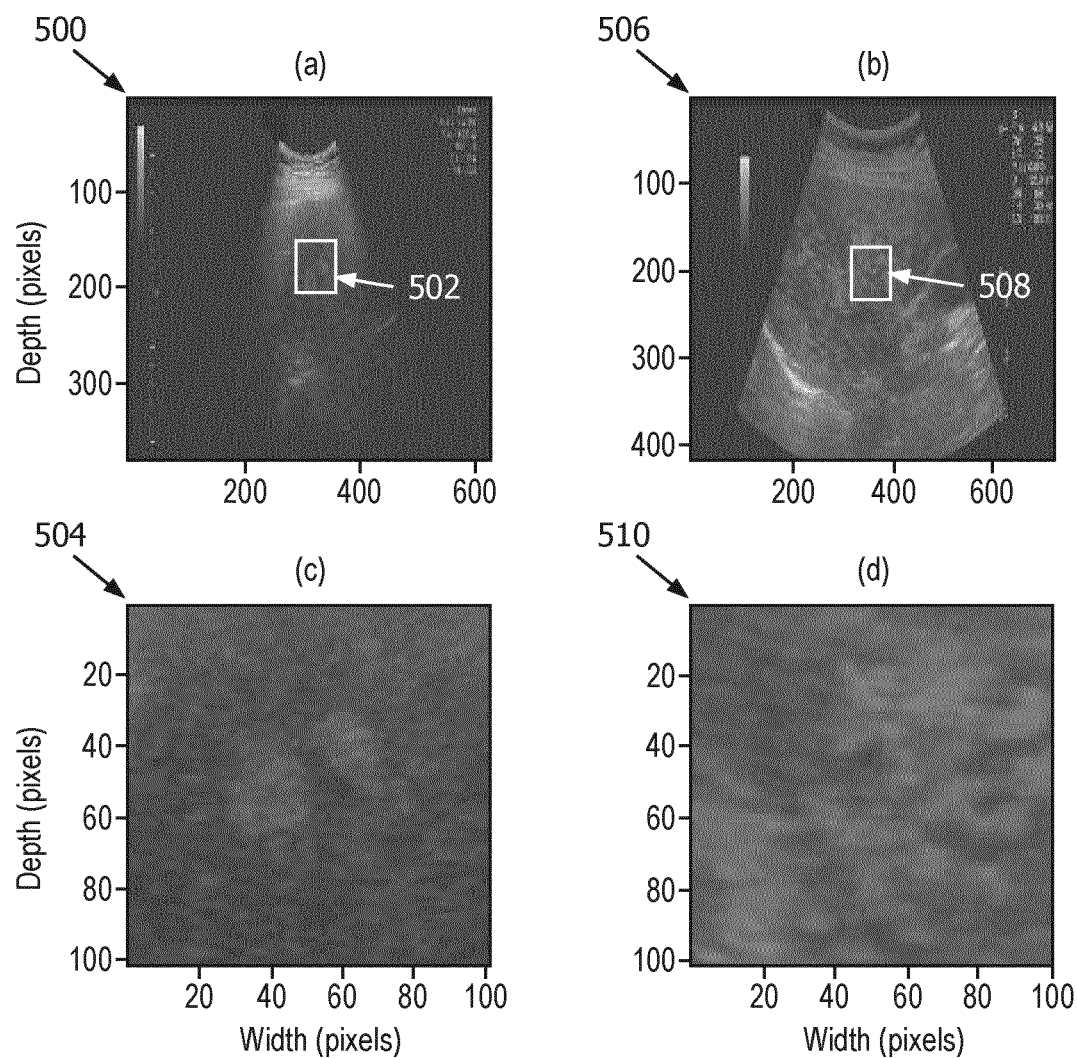
FIG. 5 shows example two-dimensional images of portions of livers with inhomogeneous fat distribution.

FIG. 5 shows example two-dimensional images of portions of livers with inhomogeneous fat distribution. Image 500 is an image of a portion of a liver including inhomogeneous fat distribution. A ROI is indicated by box 502. Image 504 is a "zoomed in" view of the ROI in box 502. Image 506 is an image of a portion of a liver including inhomogeneous fat distribution. A ROI is indicated by box 508. Image 510 is a "zoomed in" view of the ROI in box 508. Both image 500 and 502 are 2D ultrasound images acquired by an ultrasound imaging system.

As described herein, parameters may be extracted from the liver portions of ultrasound images, such as images 400, 406, 500, and/or 506. The extracted parameters may then be provided to a machine learning model to determine whether the liver portions include homogeneous and/or inhomogeneous fat. Example parameters include speckle size distribution (e.g., characteristic speckle size), pixel intensities and/or distributions thereof (e.g., probability distribution), and image homogeneity, which may be used to generate image homogeneity maps, intensity probability charts, and/or speckle size distribution diagrams.

A homogeneity map may be calculated for liver portions of 2D images or a subset of the liver portion (e.g., the ROI of box 502 in image 500). In some examples, an image homogeneity map may be calculated by a sliding window technique. For an image(i,j), where i is a number of pixels equal to the width of the image and j is a number of pixels equal to a length of the image, window (e.g., 15×15 pixels) is translated across the image in both the axial and lateral directions to cover the entire image or the entire liver region of the image. The average value (m) of the intensity values of the pixels in the window and a standard deviation (SD) of the intensity values of the pixels is calculated for each location of the window. The homogeneity point value is the standard deviation divided by the average (SD/m). In some examples, the number of homogeneity point values calculated may be equal to the number of pixels in the image or number of pixels of the liver region. In some examples, further parameters may be extracted from the homogeneity map, for example, a homogeneity index (HI). The HI may be the average of the point values of the homogeneity map or a subset of the point values of the homogeneity map (e.g., a ROI within the homogeneity map).

The homogeneity map and/or HI may be used by a machine learning model to classify (e.g., differentiate between) diffuse and inhomogeneous fat distribution in the liver. For example, for the ROI shown in image 404, the HI is 9% and the ROI shown in image 410 has an HI of 11%. In contrast, the ROI shown in image 504 has an HI of 39.8% and the ROI of image 510 has an HI of 26.23%. Thus, the HI for inhomogeneous liver fat is higher than the HI for diffuse liver fat.

In some examples, one or more probability distributions of grayscale intensity values of pixels of images may be calculated for the liver portions of 2D images or subsets within the liver portions (e.g., ROI in box 402 in image 400). In some examples, the probability distribution may be calculated by plotting a histogram of the intensity values of the pixels of the liver region and fitting a curve to the histogram to find a probability density function. In some examples, the probability density functions may be normalized. In some examples, additional parameters may be extracted from the probability density function. For example, a number of peaks and/or a width of the distribution.

Figure 6:
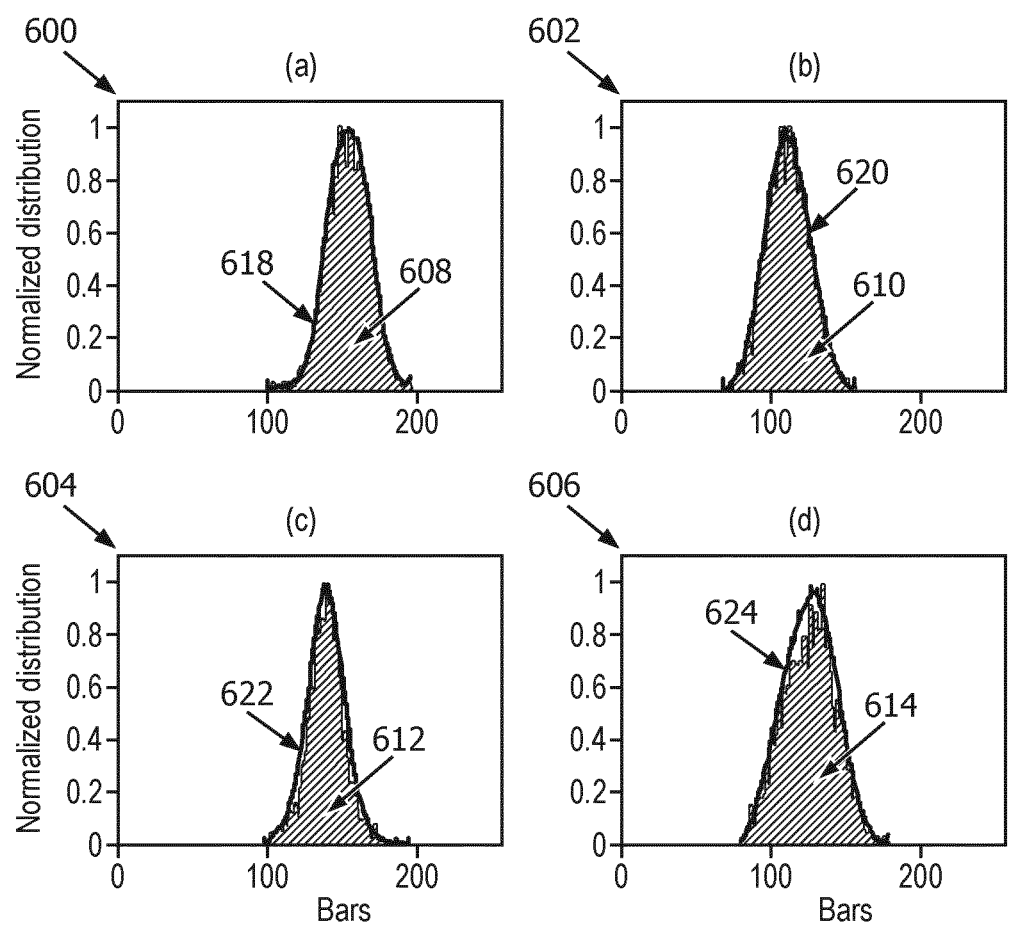
FIG. 6 shows example intensity probability distributions for homogenous fatty livers according to principles of the present disclosure.
Figure 7:
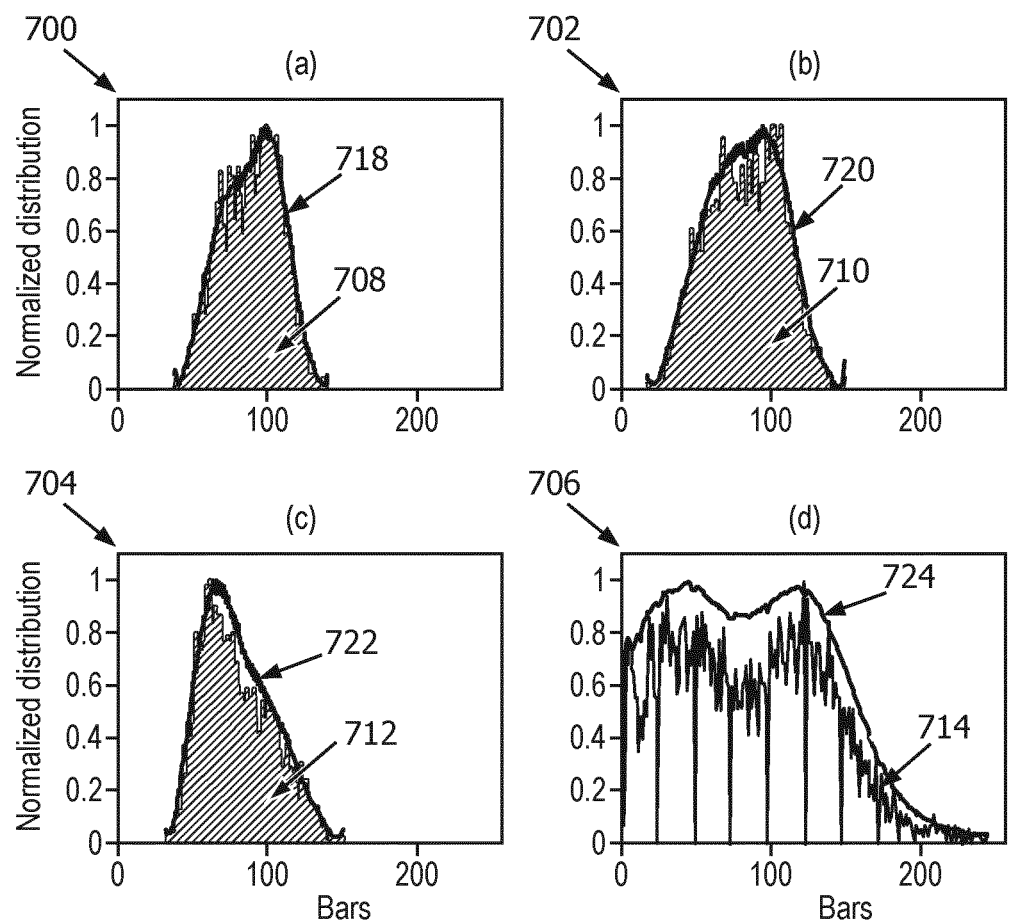
FIG. 7 shows example intensity probability distributions for inhomogeneous fatty livers according to principles of the present disclosure.

FIG. 6 shows example intensity probability distributions for homogenous fatty livers and FIG. 7 shows example intensity probability distributions for inhomogeneous (e.g., heterogeneous) fatty livers according to principles of the present disclosure. Plots 600, 602, 604, and 606 show histograms 608, 610, 612, and 614 of pixel intensities of images of homogenous fatty livers. A curve 618, 620, 622, and 624 is fitted to each histogram 608, 610, 612, and 614 to find the distribution of intensities. In other words, the distribution defined by curve 618, 620, 622, and 624 illustrates the probability of pixels in the image having a given intensity. Similarly, plots 700, 702, 704, and 706 show histograms 708, 710, 712, and 714 of pixel intensities of images of heterogeneous fatty livers. Curves 718, 720, 722, and 724 are fitted to the histograms to find the distribution of intensities of the pixels. The probability distributions shown in plots 600, 602, 604, and 606 FIG. 6 are normal distributions whereas the probability distributions shown in plots 700, 702, 704, and 706 FIG. 7 are non-normal distributions, some with multiple peaks. Furthermore, the width of the distributions for the inhomogeneous fatty livers in FIG. 7 are wider than the distributions for the diffuse fatty livers in FIG. 6. Thus, the probability distribution (e.g., the curve fitted to the histogram of pixel intensities) may be used by a machine learning model to classify diffuse and inhomogeneous fat distribution in the liver instead of or in addition to the heterogeneity map in some examples.

Figure 8:
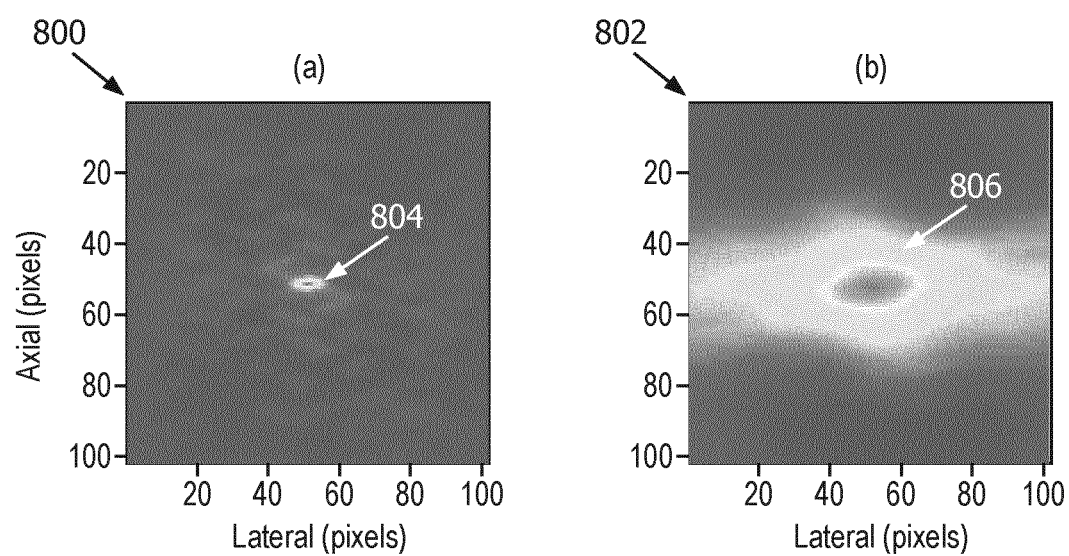
FIG. 8 shows example autocorrelation functions for a homogenous fatty liver and a inhomogeneous fatty liver according to principles of the present disclosure.

In some examples, speckle size diagrams may be extracted from the liver portion of 2D images or subsets within the liver portions (e.g., ROI). In some examples, speckle size diagrams may be generated by taking an autocorrelation of the liver portion of the image. FIG. 8 shows example autocorrelation functions for a homogenous fatty liver and an inhomogeneous fatty liver according to principles of the present disclosure. Plot 800 illustrates the autocorrelation function of a liver portion of an ultrasound image of a liver with homogeneous fat distribution. Plot 802 illustrates the autocorrelation function of a liver portion of an ultrasound image of a liver with inhomogeneous fat distribution. In some examples, a characteristic speckle size may be calculated by measuring a height and/or width of the peak of the autocorrelation function. In some examples, the characteristic speckle size may be calculated by taking a ratio of the height and the width. The speckle 804 size of plot 800 is smaller than the speckle 806 of plot 802. Accordingly, the speckle size distribution, such as the speckle size distribution determined from taking the autocorrelation function, may be used by a machine learning model to classify diffuse and inhomogeneous fat distribution in the liver instead of or in addition to the image heterogeneity map and/or intensity probability chart.

The speckle size diagram may be system dependent in some applications. In some examples, the speckle size diagram may vary depending on the type of ultrasound probe used and/or image acquisition settings. Accordingly, in some examples, the autocorrelation function and/or speckle size distribution derived therefrom may be normalized prior to being provided to the machine learning model. In some examples, the speckle size distribution may be normalized based on measurements of speckle from a standardized reference phantom. In some examples, the speckle size distribution may be normalized based on a point-spread function of ultrasound imaging systems.

Although image heterogeneity maps, intensity probability distribution charts, and speckle size diagrams are provided as examples, other parameters may be extracted from 2D ultrasound images to provide to a machine learning model for classifying diffuse and inhomogeneous liver fat. Furthermore, although the machine learning model is described as classifying liver fat as homogeneous or inhomogeneous, in some examples, the machine learning model may make more detailed classifications. FIG. 9 is a table of example parameters extracted from two dimensional images of livers. As shown in FIG. 9, the column labeled "description," various types of homogeneous and inhomogeneous liver fat deposits exist. Accordingly, in some examples, parameters extracted from ultrasound images may be used by the machine learning model to classify the fat deposits not only as homogeneous or inhomogeneous, but a particular subtype of homogeneous or inhomogeneous liver fat.

Figure 10:
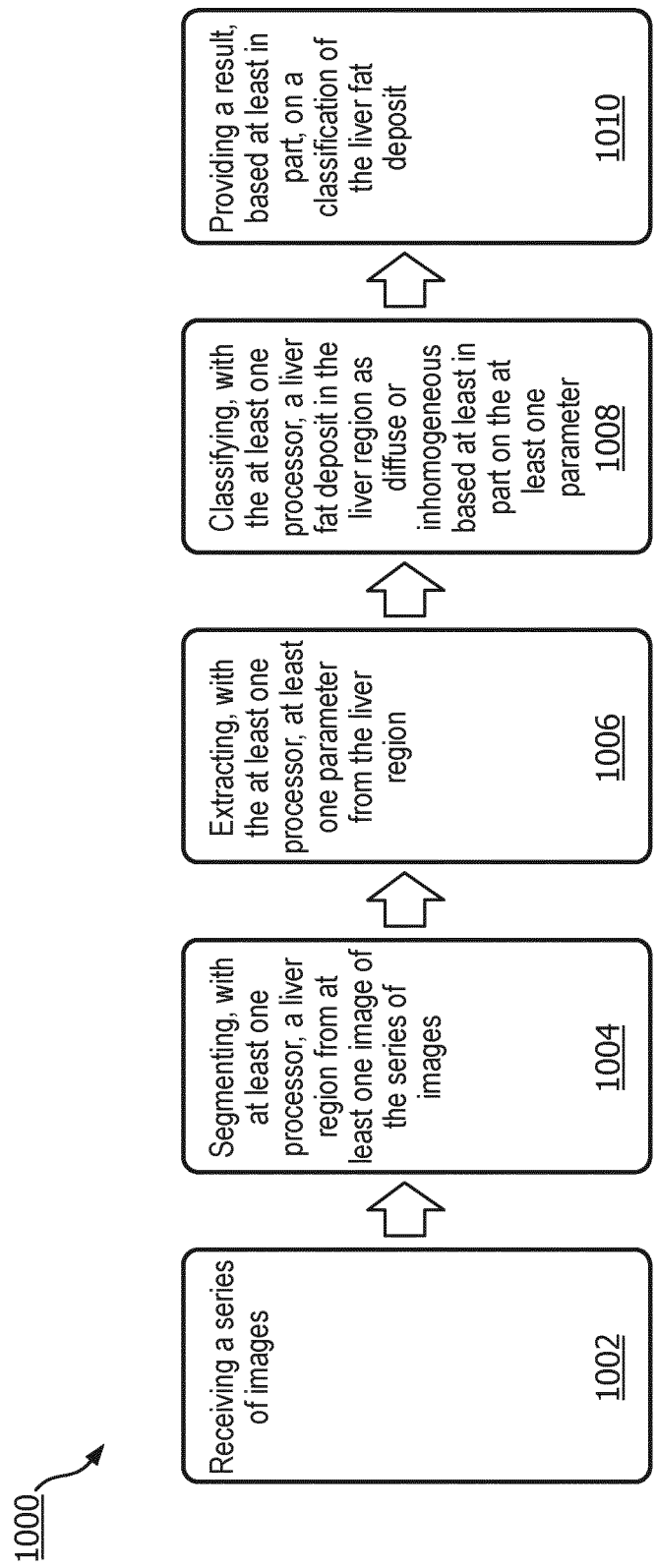
FIG. 10 is a flow chart of a method according to principles of the present disclosure.

FIG. 10 is a flow chart of a method according to principles of the present disclosure. In some examples, the method 1000 may be performed in whole or in part by an ultrasound imaging system, such as ultrasound imaging system 100 shown in FIG. 1. In some examples, the method 1000 may include some or all of the technique illustrated in FIG. 2.

One or more processors, such as image processor 136, may receive a series of images as indicated at block 1002. The processor may segment a liver region from at least one image of the series of images as indicated at block 1004. Optionally, in some examples, the segmented liver region may be provided on a display for review by a user. The user may alter the segmentation of the liver if desired.

The one or more processors may extract at least one parameter from the liver region as indicated by block 1006. In some examples, the one or more processors may identify at least one of a hepatic vessel or other anatomical feature in the liver region and exclude the identified hepatic vessel or other anatomical feature from the liver region prior to extracting the at least one parameter. In some examples, the at least one parameter may include a heterogeneity map, a probability distribution, and/or a speckle size.

In some examples, extracting the heterogeneity map may include translating a window across the liver region in both the axial and lateral directions, calculating an average value of intensity values of pixels in the window for individual translations of the window, calculating a standard deviation of the intensity values of the pixels in the window for the individual translations of the window, and calculating a homogeneity point value for the individual translations of the window by dividing the standard deviation by the average value. Optionally, the homogeneity index (HI) may be extracted from the map. The HI may be the average value of the homogeneity points. In some examples, extracting the intensity probability chart may include plotting intensity values of pixels of the liver region in a histogram and fitting a curve to the histogram. Optionally, a width of the probability distribution may be calculated from the curve. In some examples, extracting the speckle size diagram includes calculating an autocorrelation function of the liver region.

The at least one processor may classify a liver fat deposit in the liver region as diffuse or inhomogeneous based at least in part on the at least one parameter as shown by block 1008. In some examples, the classifying may be performed by a machine learning model, such as a neural network, implemented by the at least one processor. In some examples, the method 1000 may further include training the machine learning model to classify the liver fat deposit by providing a training data set comprising parameters extracted from liver regions of images labeled as either diffuse or inhomogeneous.

Figure 11:
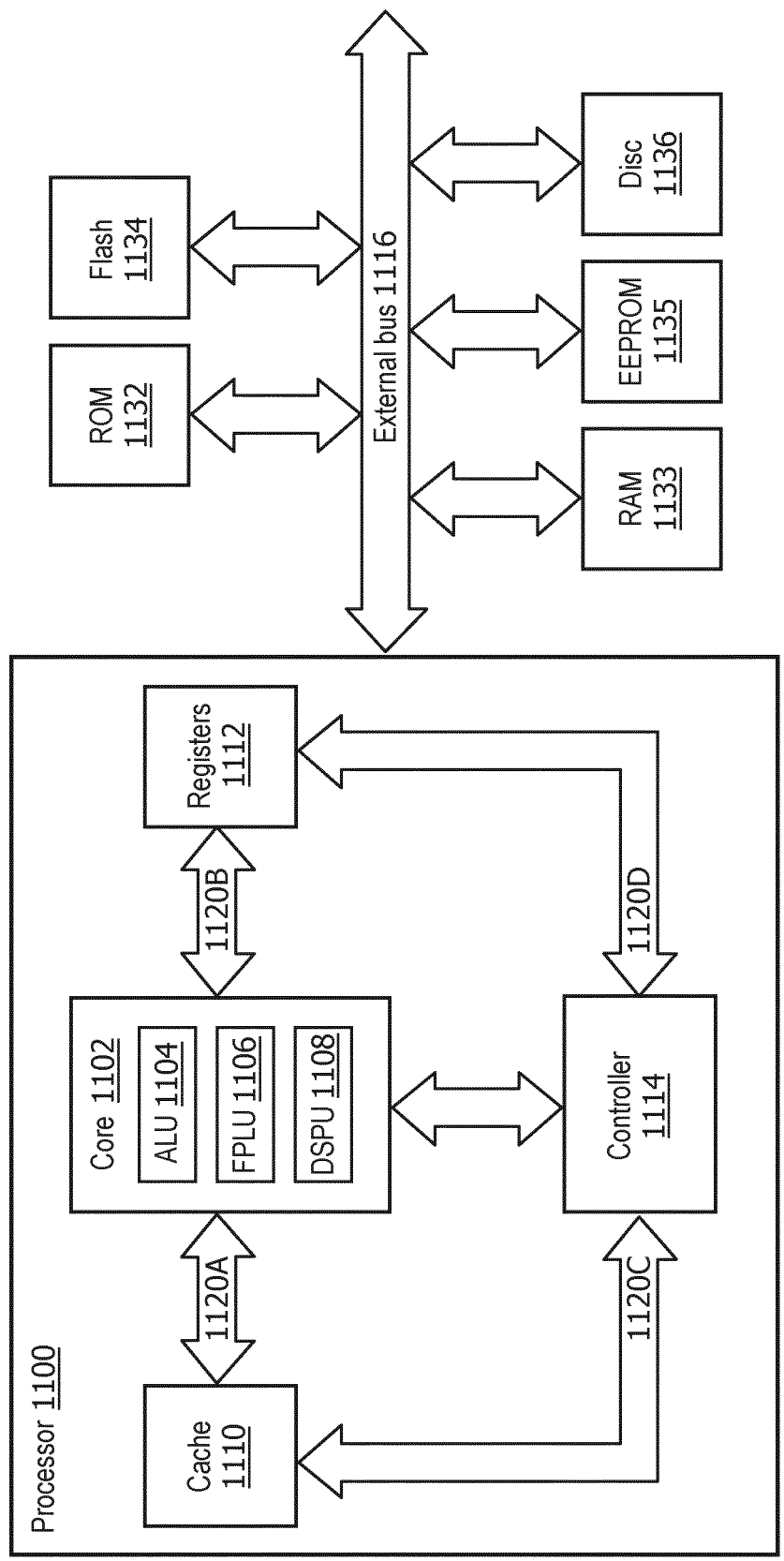
FIG. 11 is a block diagram illustrating an example processor 1100 according to principles of the present disclosure.

As shown in block 1010, the at least one processor and/or other components of the imaging system (e.g., display 138, user interface 124) may provide a result, based at least in part, on a classification of the liver fat deposit. In some examples, the result may be provided to a user by displaying a graphical overlay over the image, or the liver region of the image, The graphical overlay may include a plurality of pixels corresponding to a plurality of pixels of the liver region, wherein a property of a pixel of the plurality of pixels of the graphical overlay is based, at least in part, on the classification FIG. 11 is a block diagram illustrating an example processor 1100 according to principles of the present disclosure. Processor 1100 may be used to implement one or more processors and/or controllers described herein, for example, image processor 136 shown in FIG. 1 and/or any other processor or controller shown in FIG. 1. Processor 1100 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

The processor 1100 may include one or more cores 1102. The core 1102 may include one or more arithmetic logic units (ALU) 1104. In some embodiments, the core 1102 may include a floating point logic unit (FPLU) 1106 and/or a digital signal processing unit (DSPU) 1108 in addition to or instead of the ALU 1104.

The processor 1100 may include one or more registers 1112 communicatively coupled to the core 1102. The registers 1112 may be implemented using dedicated logic gate circuits (e.g., flip-flops) and/or any memory technology. In some embodiments the registers 1112 may be implemented using static memory. The register may provide data, instructions and addresses to the core 1102.

In some embodiments, processor 1100 may include one or more levels of cache memory 1110 communicatively coupled to the core 1102. The cache memory 1110 may provide computer-readable instructions to the core 1102 for execution. The cache memory 1110 may provide data for processing by the core 1102. In some embodiments, the computer-readable instructions may have been provided to the cache memory 1110 by a local memory, for example, local memory attached to the external bus 1116. The cache memory 1110 may be implemented with any suitable cache memory type, for example, metal-oxide semiconductor (MOS) memory such as static random access memory (SRAM), dynamic random access memory (DRAM), and/or any other suitable memory technology.

The processor 1100 may include a controller 1114, which may control input to the processor 1100 from other processors and/or components included in a system (e.g., control panel 152 and scan converter 130 shown in FIG. 1) and/or outputs from the processor 1100 to other processors and/or components included in the system (e.g., display 138 and volume renderer 134 shown in FIG. 1). Controller 1114 may control the data paths in the ALU 1104, FPLU 1106 and/or DSPU 1108. Controller 1114 may be implemented as one or more state machines, data paths and/or dedicated control logic. The gates of controller 1114 may be implemented as standalone gates, FPGA, ASIC or any other suitable technology.

The registers 1112 and the cache memory 1110 may communicate with controller 1114 and core 1102 via internal connections 1120A, 1120B, 1120C and 1120D. Internal connections may implemented as a bus, multiplexor, crossbar switch, and/or any other suitable connection technology.

Inputs and outputs for the processor 1100 may be provided via a bus 1116, which may include one or more conductive lines. The bus 1116 may be communicatively coupled to one or more components of processor 1100, for example the controller 1114, cache memory 1110, and/or register 1112. The bus 1116 may be coupled to one or more components of the system, such as display 138 and control panel 152 mentioned previously.

The bus 1116 may be coupled to one or more external memories. The external memories may include Read Only Memory (ROM) 1132. ROM 1132 may be a masked ROM, Electronically Programmable Read Only Memory (EPROM) or any other suitable technology. The external memory may include Random Access Memory (RAM) 1133. RAM 1133 may be a static RAM, battery backed up static RAM, Dynamic RAM (DRAM) or any other suitable technology. The external memory may include Electrically Erasable Programmable Read Only Memory (EEPROM) 1135. The external memory may include Flash memory 1134. The external memory may include a magnetic storage device such as disc 1136. In some embodiments, the external memories may be included in a system, such as ultrasound imaging system 100 shown in FIG. 1, for example local memory 142.

The systems, methods, and apparatuses disclosed herein may reduce the impact of inhomogeneous fatty liver deposits to interfere with algorithms for calculating liver fat quantification measurements by determining which regions of the liver include inhomogeneous fatty liver deposits. In some examples, these regions may be removed from the calculation of the fat quantification measurements. In some examples, a user may be alerted to the regions of inhomogeneous liver fat so that the user may select an ROI for calculating the liver fat quantification measurement may be placed in a region without inhomogeneous liver fat. Excluding regions with inhomogeneous fat distribution may provide more consistent and/or reliable measurements for liver fat quantification in some applications. In some applications, providing information to the user regarding the location of inhomogeneous liver fat deposits are located may decrease the time required by the user to obtain liver fat quantification measurements.

Although the examples described herein are in reference to an ultrasound imaging system, the analysis of images may also be performed by a separate computing system, which may store ultrasound images for post-ultrasound exam review. For example, a picture archiving and communication system (PACS). The PACS may be communicatively coupled to an ultrasound imaging system by a wired or wireless connection. For example, the PACS may receive ultrasound images acquired by the imaging system via an Ethernet cable and/or Wi-Fi. Furthermore, although the examples described herein discuss processing of ultrasound image data, it is understood that the principles of the present disclosure are not limited to ultrasound and may be applied to image data from other modalities such as magnetic resonance imaging and computed tomography.

In various embodiments where components, systems and/or methods are implemented using a programmable device, such as a computer-based system or programmable logic, it should be appreciated that the above-described systems and methods can be implemented using any of various known or later developed programming languages, such as "C", "C++", "C#", "Java", "Python", and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software and firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instruction to perform the functions described herein.

Although the present system may have been described with particular reference to an ultrasound imaging system, it is also envisioned that the present system can be extended to other medical imaging systems where one or more images are obtained in a systematic manner. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

The invention claimed is:

1. An ultrasound imaging system configured to provide classification of liver fat deposits, the system comprising:
a non-transitory computer readable medium encoded with instructions and configured to store a series of ultrasound images; and
at least one processor in communication with the non-transitory computer readable medium and configured to execute the instructions, wherein when executed, the instructions cause the at least one processor to:
segment a liver region from at least one image of the series of ultrasound images;
extract at least one parameter from the liver region;
classify a liver fat deposit in the liver region as diffuse or inhomogeneous based at least in part on the at least one parameter; and
provide a result to a display, based at least in part, on a classification of the liver fat deposit, wherein the result comprises a graphical overlay for displaying on the at least one image on the display, wherein the graphical overlay comprises a plurality of pixels corresponding to a plurality of pixels of the liver region, wherein the plurality of pixels of the graphical overlay indicate at least the classification of the liver fat deposit as diffuse or inhomogeneous.

2. The system of claim 1, wherein the at least one processor is further configured to identify at least one of a hepatic vessel or other anatomical feature in the liver region and exclude the identified hepatic vessel or the other anatomical feature from the liver region prior to extraction of the at least one parameter.

3. The system of claim 1, further comprising the display and a user interface, wherein the user interface is configured to receive a user input indicating a region of interest (ROI) within the liver region, wherein the at least one processor is further configured to provide display information for a warning when the ROI includes the liver fat deposit classified as inhomogeneous.

4. The system of claim 1, wherein the at least one processor is configured to implement a machine learning model to analyze the at least one parameter and generate the classification of the liver fat deposit.

5. The system of claim 4, wherein the machine learning model comprises a neural network.

6. The system of claim 1, wherein the at least one parameter comprises at least one of a heterogeneity map, a distribution of pixel intensities, or a speckle size.

7. The system of claim 1, wherein the at least one processor is further configured to calculate a fat quantification measurement based, at least in part, on the classification of the liver fat deposit.

8. The system of claim 7, wherein the fat quantification measurement is based on the liver region excluding the liver fat deposit classified as inhomogeneous.

9. A method for providing a classification of liver fat deposits, the method comprising:
receiving a series of ultrasound images;
segmenting, with at least one processor, a liver region from at least one image of the series of ultrasound images;
extracting, with the at least one processor, at least one parameter from the liver region;
classifying, with the at least one processor, a liver fat deposit in the liver region as diffuse or inhomogeneous based at least in part on the at least one parameter; and
providing a result to a display, based at least in part, on a classification of the liver fat deposit, wherein the result comprises a graphical overlay for displaying on the at least one image on the display, wherein the graphical overlay comprises a plurality of pixels corresponding to a plurality of pixels of the liver region, wherein the plurality of pixels of the graphical overlay indicate at least the classification of the liver fat deposit as diffuse or inhomogeneous.

10. The method of claim 9, further comprising:
identifying at least one of a hepatic vessel or other anatomical feature in the liver region; and
excluding the identified hepatic vessel or the other anatomical feature from the liver region prior to extracting the at least one parameter.

11. The method of claim 9, wherein the at least one parameter comprises at least one of a heterogeneity map, a probability distribution of pixel intensities, or a speckle size.

12. The method of claim 11, wherein extracting the heterogeneity map comprises:
translating a window across the liver region in both axial and lateral directions;
calculating an average value of intensity values of pixels in the window for individual translations of the window, calculating a standard deviation of the intensity values of the pixels in the window for the individual translations of the window; and calculating a homogeneity point value for the individual translations of the window by dividing the standard deviation by the average value.

13. The method of claim 12, further comprising extracting a homogeneity index, wherein the homogeneity index comprises an average value of the homogeneity point values for the individual translations of the window.

14. The method of claim 11, wherein extracting the probability distribution comprises:

plotting intensity values of pixels of the liver region in a histogram; and fitting a curve to the histogram.

15. The method of claim 14, further comprising calculating a width of the probability distribution based, at least in part, on the curve.

16. The method of claim 11, wherein extracting the speckle size comprises calculating an autocorrelation function of the liver region.

17. The method of claim 9, wherein the classifying is performed by a machine learning model.

18. The method of claim 17, further comprising training the machine learning model to classify the liver fat deposit by providing a training data set comprising parameters extracted from liver regions of images labeled as either diffuse or inhomogeneous.

* * * * *